(No Model.) 5 Sheets—Sheet 1.
S. T. BARRAS.
PROFILE CUTTING MACHINE.
No. 397,888. Patented Feb. 19, 1889.
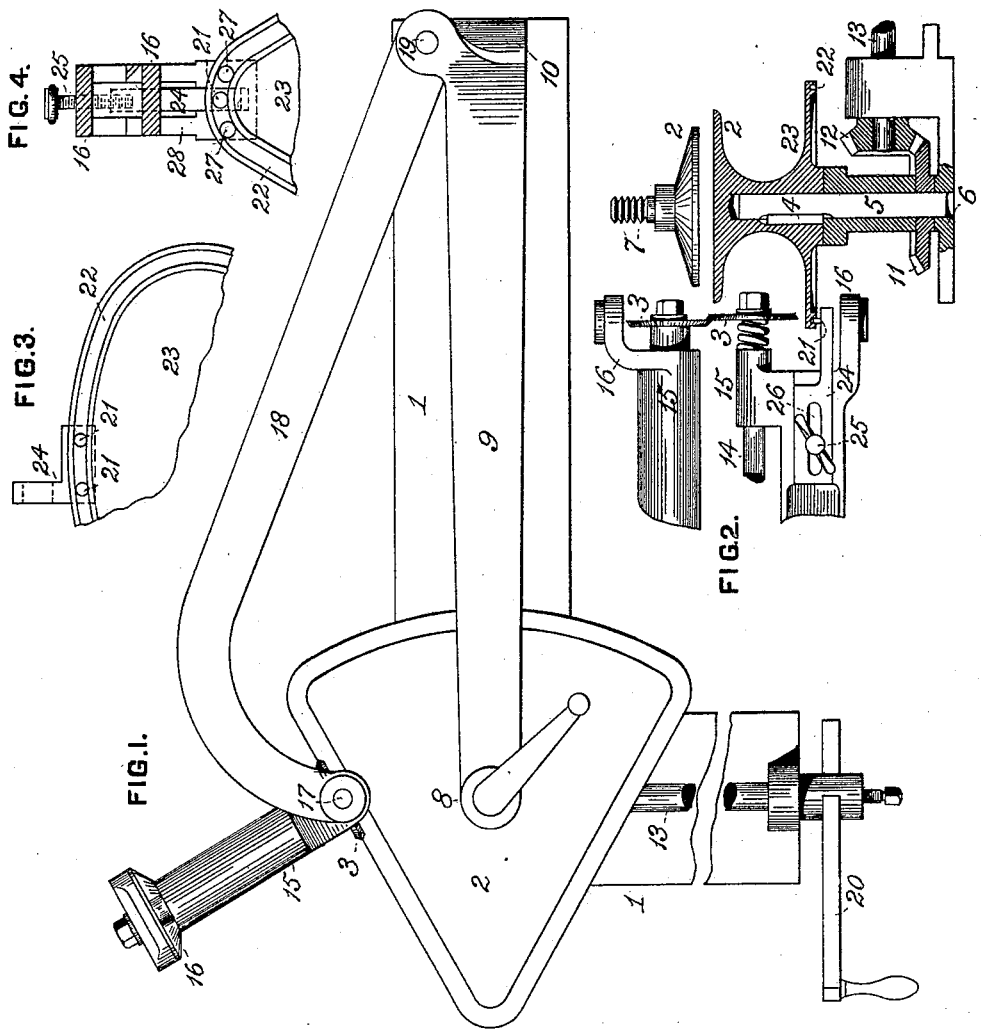
WITNESSES:
R. H. Whittlesey,
F. E. Gaither.
INVENTOR,
Sam¹ Thompson Barras,
by J. Snowden Bell,
ATTORNEY.

(No Model.) 5 Sheets—Sheet 2.

S. T. BARRAS.
PROFILE CUTTING MACHINE.

No. 397,888. Patented Feb. 19, 1889.

WITNESSES:
R. H. Whittlesey,
F. E. Gaither.

INVENTOR.
Saml Thompson Barras,
by J Snowden Bell,
ATTORNEY.

(No Model.) 5 Sheets—Sheet 3.
S. T. BARRAS.
PROFILE CUTTING MACHINE.

No. 397,888. Patented Feb. 19, 1889.

WITNESSES:
R. H. Whittlesey
F. E. Gaither

INVENTOR,
Sam'l Thompson Barras
By J. Snowden Bell,
ATTORNEY.

(No Model.)  5 Sheets—Sheet 4.

S. T. BARRAS.
PROFILE CUTTING MACHINE.

No. 397,888.  Patented Feb. 19, 1889.

WITNESSES:
R. H. Whittlesey,
F. E. Gaither.

INVENTOR,
Sam'l Thompson Barras,
by J. Snowden Bell,
ATTORNEY.

(No Model.) 5 Sheets—Sheet 5.

S. T. BARRAS.
PROFILE CUTTING MACHINE.

No. 397,888. Patented Feb. 19, 1889.

WITNESSES:
R. H. Whittlesey
F. E. Gaither

INVENTOR
Sam'l Thompson Barras,
by J. Snowden Bell,
ATTORNEY.

ly cut from plates of
UNITED STATES PATENT OFFICE.

SAMUEL T. BARRAS, OF PHILADELPHIA, ASSIGNOR OF ONE-HALF TO WILLIAM A. CHEYNEY, OF THORNBURY, DELAWARE COUNTY, PENNSYLVANIA.

PROFILE-CUTTING MACHINE.

SPECIFICATION forming part of Letters Patent No. 397,888, dated February 19, 1889.

Application filed May 3, 1888. Serial No. 272,655. (No model.)

*To all whom it may concern:*

Be it known that I, SAMUEL THOMPSON BARRAS, of the city and county of Philadelphia, in the State of Pennsylvania, have invented a certain new and useful Improvement in Profile-Cutting Machines, of which improvement the following is a specification.

The object of my invention is to provide a machine of simple and comparatively inexpensive construction, in the operation of which regular or irregular forms may be accurately and expeditiously cut from plates of sheet metal, pasteboard, rubber, &c., in correspondence with patterns of desired shape.

To this end my invention, generally stated, consists in the combination of a work-holding device and a cutting mechanism fitted to move in supports, with the further capacity of movement relatively one to the other, and mechanism controlling the relative positions of said work-holding device and cutting mechanism during the operation of the latter in accordance with the outline of the form which is to be cut.

The improvement claimed is hereinafter fully set forth.

Figure 5:
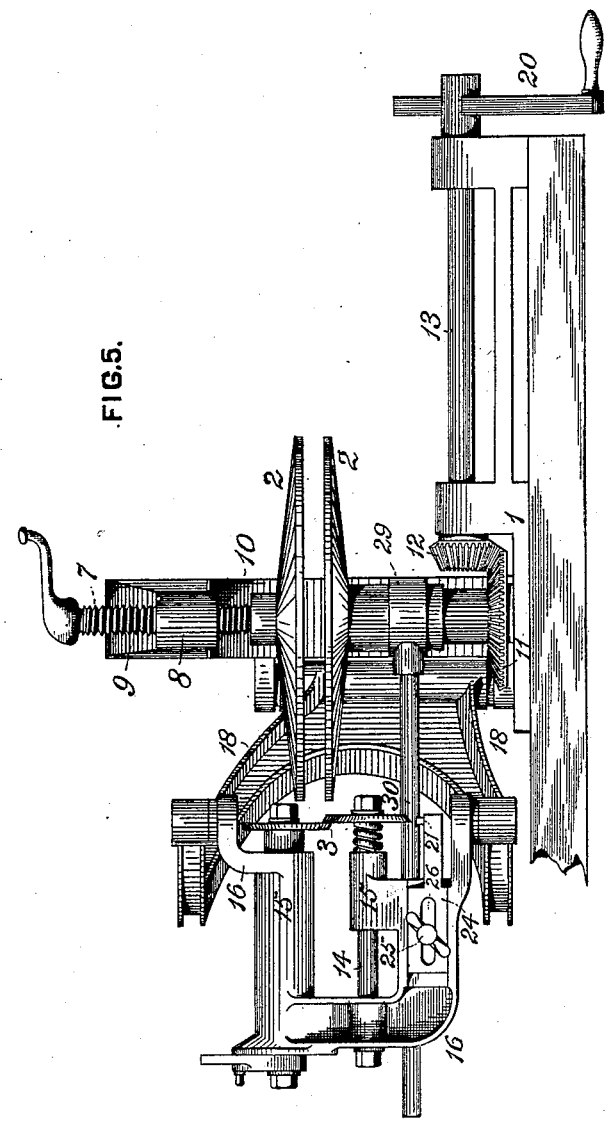
Figure 6:
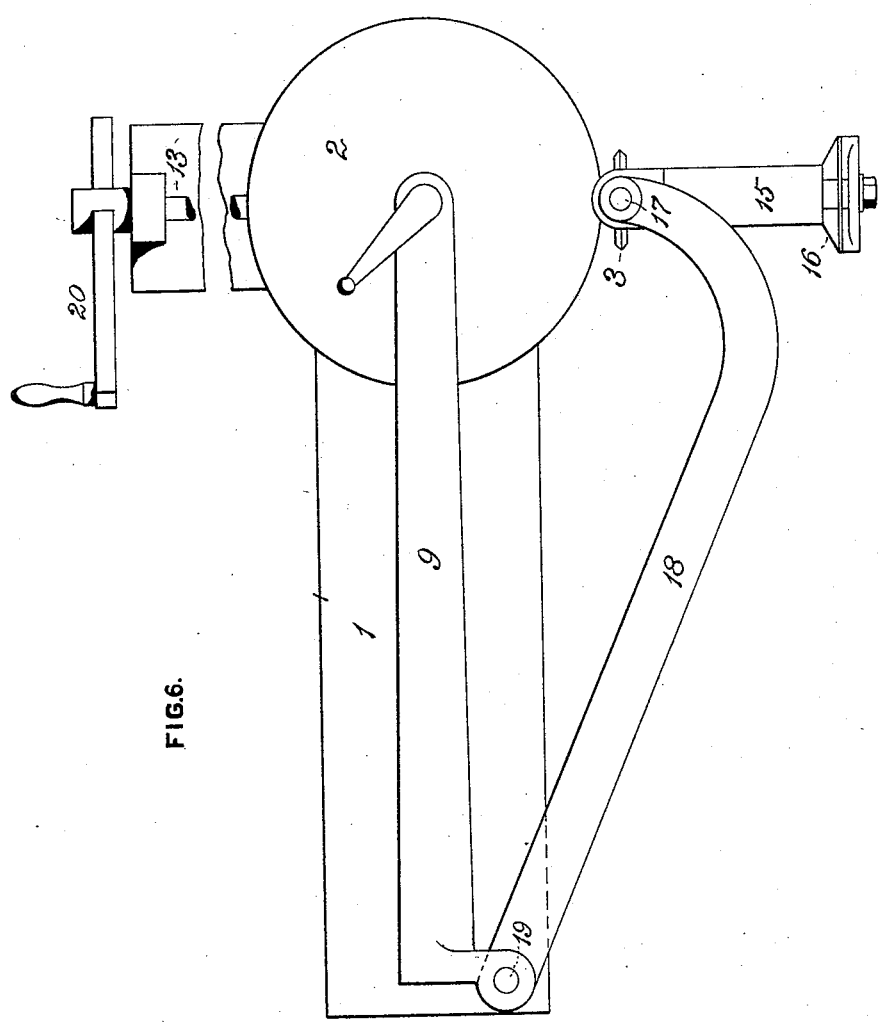
Figure 7:
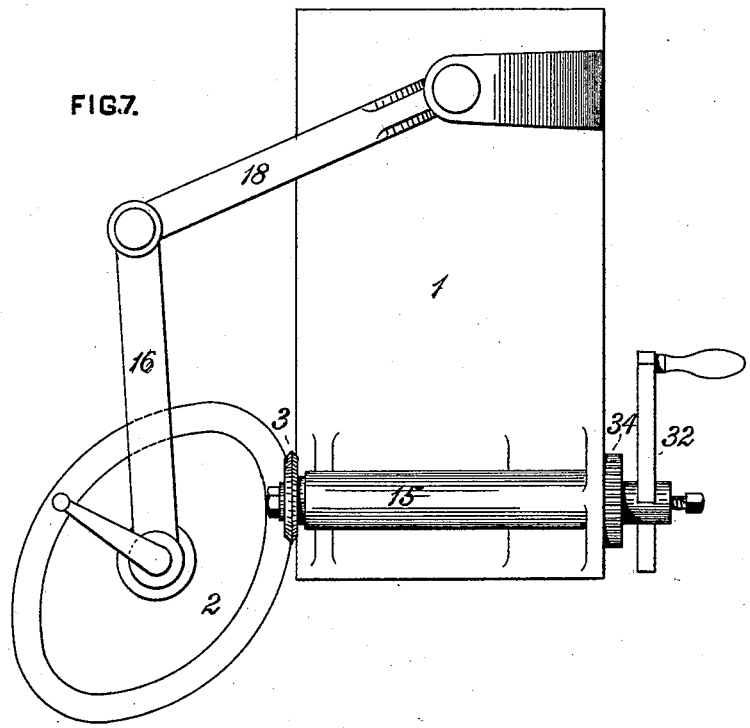

In the accompanying drawings, Figure 1 is a plan or top view of a profile-cutting machine embodying my invention; Fig. 2, an end view, partly in section, showing the cutting mechanism and work-holding device; Figs. 3 and 4, plan views illustrating the relation of the guide-pins and pattern; Fig. 5, an end view, in elevation, of the machine as adapted to the cutting of circles; Fig. 6, a plan view of the same; Fig. 7, a plan view, and Fig. 8 an end view in elevation, of a machine illustrating a modification of my invention; Fig. 9, a plan view, and Fig. 10 an end view in elevation, of a machine illustrating a further modification.

In the practice of my invention I provide a substantial bed-plate, 1, upon which are mounted the bearings or supports of a work-holding device and a cutting mechanism, the former consisting of a pair of clamping-plates, 2 2, between which the work or sheet of material to be cut is secured, and the latter of a pair of rotary cutters, 3 3, each fixed upon a shaft. The clamping-plates 2 2 and cutters 3 3 are fitted to move in their respective bearings, and said bearings are mounted upon the bed-plate with the capacity of relative movement thereon—that is to say, the bearings of the clamping-plates may be fixed and those of the cutters movable, or vice versa, or both the clamping-plates and the cutter-bearings may be movable. The outline of the form which is cut, when the same is other than circular, is resultant upon successive changes in the relative positions of the bearings of the clamping-plates and of the cutters during the action of the latter in severing the material to be operated on, such changes being effected, in proper direction and sequence, by the engagement of one or more guide-pins connected to the cutter-support, with a groove in a pattern fixed to one of the clamping-plates, said pattern-groove being of corresponding contour with the form which is desired to be cut. The drawings illustrate different combinations of these elements, which, while respectively varying as to structural relation and detail, accord with and embody in each instance the operative conditions and essential features of construction above set forth, which characterize the application of my invention in a machine adapted to practical operation.

Referring to Figs. 1 to 6, inclusive, which illustrate a machine in which the work-holding device is mounted in fixed and the cutting mechanism in movable bearings, the lower of the clamping-plates 2 is secured by a key, 4, to a vertical shaft, 5, journaled in a bearing, 6, on the bed-plate 1, and the upper clamping-plate is connected to the end of a screw, 7, which is concentric with the shaft 5 of the lower clamping-plate and engages a nut, 8, formed in or secured to an arm or bracket, 9, extending horizontally from a post or standard, 10, on the bed-plate. The end of the screw to which the upper clamping-plate is attached carries a collar, which fits freely within a corresponding recess in the hub of the clamping-plate, so that the latter may be free to rotate upon the screw 7 while partaking of the longitudinal movements of the screw in each direction, by which, respectively, the sheet of material is clamped between the plates 2 and the cut form released therefrom. The shaft 5 of the lower clamping-plate carries a bevel-gear, 11, meshing with a corresponding pinion, 12, fixed upon a driving-shaft, 13, provided with a crank, 20, by which rotation is imparted to the two clamping-plates and the sheet of material which is interposed and held firmly between them by the screw 7. The cutters 3, which are circular in form and provided with properly-beveled cutting-edges, which overlap and effect a shearing cut, are fixed upon shafts 14, mounted in bearings 15 in a frame, 16, which is journaled by pivots 17 to another frame, 18, the opposite end of which is in turn journaled by pivots 19 to the post or standard 10. By means of the pivoted frames 16 and 18 the cutters 3 are free to be moved in all directions in a horizontal plane relatively to the axis of the clamping-plates 2, and thereby to operate at the same or at different distances therefrom upon the sheet of material held between them, as required to traverse the contour of any form which may be desired to be cut. The upper cutter is mounted in an adjustable eccentric bearing—that is to say, a sleeve eccentric to the cutter-shaft—or otherwise suitably arranged to permit of the cutters being separated to admit the sheet of material, and thereafter brought together into operative position, as shown, so as to cut out a section which is central in or at a distance from the edges of a sheet without making a lateral entering cut in said sheet. The cutters 3 are in this instance rotated by frictional contact with the material operated on, and are caused to traverse the same in the path of the contour of the form desired by the engagement of one or more guide-pins, 21, rigidly secured to the frame 16, which carries the bearings of the cutter-shaft, with a pattern-groove, 22, formed in a pattern, 23, and corresponding in shape with the form which is to be cut. The pattern 23 may be either integral with the lower clamping-plate, 2, as shown, or be separately and independently secured upon the shaft 5, which carries the clamping-plates. The guide-pins 21 are fixed in a block or carrier, 24, which is connected adjustably to the cutter-frame by a clamping-screw, 25, passing through a longitudinal slot, 26, in the block, so that the position of the guide-pins may be varied relatively to the cutters, in order to increase or decrease the distance between the same and the axial line of the clamping-plates, as may be required for the cutting of larger or smaller forms, corresponding in shape with, but varying in dimensions from, the pattern-groove 22, as may from time to time be desired. In order that the cutters may operate tangentially, or nearly so, at all points upon the form which is cut, two or more guide-pins are preferably employed, two being shown in Fig. 3 as fixed to the carrier 24. Where the form to be cut is one which embodies curves of comparatively short radius, I provide a central guide-pin, 21, the carrier 24 of which is fixed in desired adjustment by a screw, 25, to the cutter-frame 16, and which serves to regulate the distance of the cutters from the axis of the clamping-plates, and two lateral guide-pins, 27, fixed in a carrier, 28, which is fitted to slide in the frame 16 toward and from the axis of the clamping-plates, said lateral pins acting to maintain the cutters in position to effect a substantially tangential cut at all points in their traverse on the sheet of material upon which they act.

The machine above described may be readily adapted to the cutting of circular forms by removing the pattern from the shaft 5 and substituting a collar, 29, to which is fixed a radius-bar, 30, fitting a socket on the cutter-frame, to which it is connected at any desired point in its length, governed by the radius of the circle to be cut. The shaft 5 of the clamping-plates rotates freely within the collar 29, and the cutters being maintained at a determined distance from the axis of the clamping-plates a circular form will be cut from a sheet of material in one revolution of the shaft 5.

Figure 8:
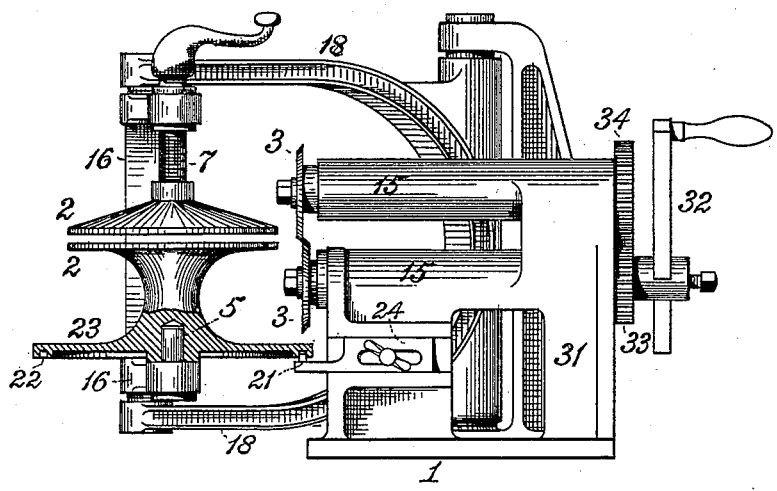
Figure 9:
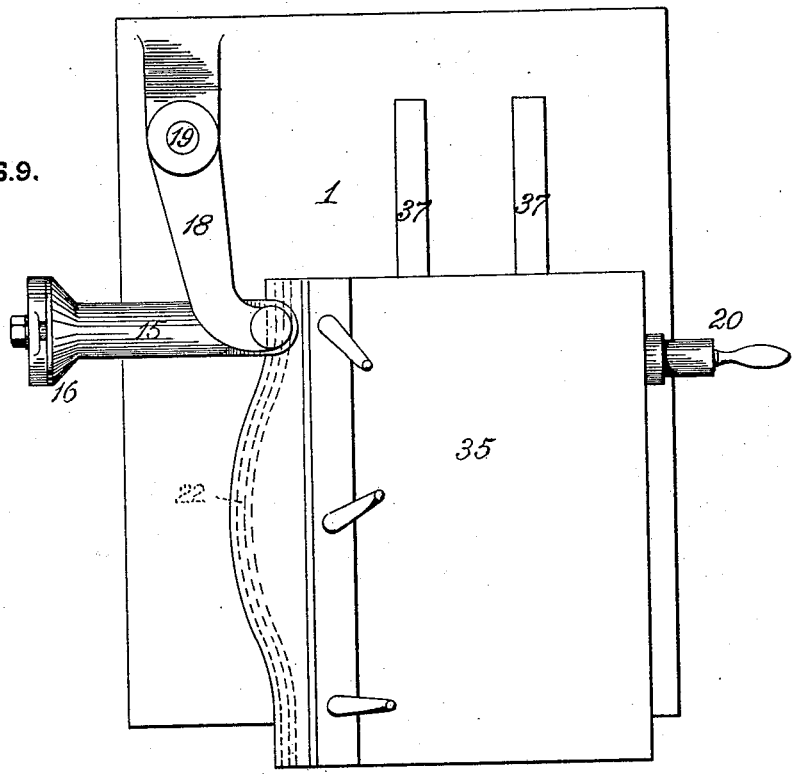

The modification shown in Figs. 7 and 8 differs from the construction above described in the reversal of the relative positions of the bearings of the clamping-plates and of the cutters, the former being in this case mounted in a movable frame, 16, pivoted to another movable frame, 18, corresponding with the similarly-numbered frames of the preceding construction, and the latter being fixed in a frame, 31, secured to the bed-plate 1. The cutters 3 3 are positively driven, the lower cutter-shaft carrying a crank-arm, 32, by which it is rotated, and a spur-gear, 33, meshing with a corresponding gear, 34, on the upper cutter-shaft. The clamping-plates 2 are rotated by the frictional contact of the cutters with the interposed sheet of material, and the position of their axis relatively to the cutters is varied in accordance with the contour of the form, as in the former case, by the engagement of one or more guide-pins, 21, on a carrier, 24, connected to the cutter-frame with the groove 22 of a pattern, 23, on the shaft 5 of the lower clamping-plate.

Figure 10:
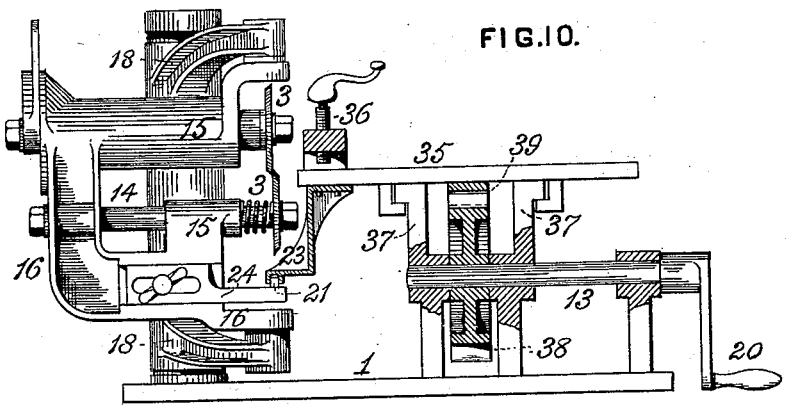

Figs. 9 and 10 illustrate a further modification adapted to effect a waved, serpentine, or alternately oppositely-inclined cut longitudinally or transversely on a sheet of material, and in which both the cutter-bearings and the clamping-plates are movable relatively one to the other during the operation of the machine. The bearings 15 of the cutters 3 3 are mounted in a movable frame, 16, pivoted to another frame, 18, which is in turn pivoted to the bed-plate, as in the instance first described. The material to be cut is placed upon a table, 35, corresponding in function with the lower clamping-plate of the previous instances, and held firmly thereon by clamping-screws 36, corresponding with the upper clamping-plate. The table 35 is fitted to slide upon guides 37 toward and from the fixed pivot 19 of the frame 18, and is traversed in opposite directions thereon by means of a driving-shaft, 13, which is rotated by a crank, 20, and carries a spur-gear, 38, meshing with a rack, 39, fixed to the lower side of the table. The cutters 3 3 are rotated by frictional contact with the moving material to be cut, and their position relatively to the line of traverse of the table is varied to effect a cut of the form desired by the engagement of a guide-pin, 21, on a carrier, 24, connected adjustably to the cutter-frame, with a pattern-groove, 22, in a pattern, 23, secured to and traversing with the table.

My improvement enables any desired number of forms to be cut with facility and rapidity in accurate correspondence with each other and with a given pattern, which may be either of the same or of greater or less dimensions than the forms produced. Ovals, sector shapes, and other figures, regular or irregular, may be cut by the provision of suitably-shaped patterns, the attachment and detachment of which to and from the machine can be readily effected as required, and by the adjustment of the guide-pins larger or smaller forms similar in shape and varying as desired in dimensions from any selected pattern may be produced. A further substantial advantage in practical use is afforded by the convenient adaptability of the machine to the cutting of circular forms of different desired diameters, a simple and expeditious adjustment of the parts sufficing for this purpose.

I claim as my invention and desire to secure by Letters Patent—

1. In a machine for cutting sheets of metal, &c., the combination of the bed-plate, the articulated frame pivoted thereto, the bearing-frame supported thereon, a pair of cutters mounted in suitable bearings, the work-holder, the grooved pattern, and the guide-pin adapted to engage the groove of said pattern, substantially as set forth.

2. In a machine for cutting sheets of metal, &c., the combination of the bed-plate, the articulated frame pivoted thereto, the bearing-frame supported thereon, a pair of cutters mounted in suitable bearings, the work-holder, the grooved pattern, and a pair of guide-pins fixed adjacent one to the other and engaging the groove of the pattern, these members being combined for joint operation to maintain a line of direction for the cutter tangential to the cut, substantially as set forth.

3. In a machine for cutting sheets of metal, &c., the combination of the bed-plate, the articulated frame pivoted thereto, the bearing fixed thereon, a pair of journaled clamping-plates, a pair of cutters mounted in suitable bearings, the grooved pattern, and the guide-pin engaging the groove of said pattern, substantially as set forth.

4. In a machine for cutting sheets of metal, &c., the combination of the bed-plate, the articulated frame pivoted thereto, the bearing-frame fixed thereon, a pair of cutters mounted in bearings in the articulated frame, the work-holder fitted to move in the fixed frame, the driving-shaft imparting movement to the work-holder, the grooved pattern connected to the work-holder, and the guide-pin connected to the cutter-bearings and engaging the groove of said pattern, substantially as set forth.

5. In a machine for cutting sheets of metal, &c., the combination of the bed-plate, the articulated frame pivoted thereto, the bearing-frame fixed thereon, a pair of cutters mounted in suitable bearings, the work-holder, the driving-shaft imparting movement to the work-holder, the grooved pattern connected to the work-holder, the guide-pin fixed to the frame of the cutter-bearings and engaging the groove of the pattern, and a pair of guide-pins fixed to a block fitted to slide on the frame of the cutter-bearings toward and from the work-holder and engaging the groove of the pattern on opposite sides of the fixed guide-pin, substantially as set forth.

S. T. BARRAS.

Witnesses:
R. KENNEDY,
WM. K. SHRYOCK.